US010114607B1

(12) United States Patent
Riggs-Zeigen et al.

(10) Patent No.: US 10,114,607 B1
(45) Date of Patent: Oct. 30, 2018

(54) PHYSIOLOGICAL STATE-DRIVEN PLAYBACK TEMPO MODIFICATION

(71) Applicant: Rock My World, Inc., San Diego, CA (US)

(72) Inventors: Adam Riggs-Zeigen, San Diego, CA (US); Alexander White, San Diego, CA (US)

(73) Assignee: Rock My World, Inc., San Diego, CA (US)

( * ) Notice: Subject to any disclaimer, the term of this patent is extended or adjusted under 35 U.S.C. 154(b) by 0 days.

(21) Appl. No.: 15/088,012

(22) Filed: Mar. 31, 2016

(51) Int. Cl.
G06F 17/00 (2006.01)
G06F 3/16 (2006.01)
G05B 15/02 (2006.01)

(52) U.S. Cl.
CPC ............. *G06F 3/165* (2013.01); *G05B 15/02* (2013.01)

(58) Field of Classification Search
CPC ................................ G05B 15/02; G06F 3/165
USPC .......................................................... 700/94
See application file for complete search history.

(56) References Cited

U.S. PATENT DOCUMENTS

| 4,164,732 | A | 8/1979 | Pischiera |
| 5,215,468 | A | 6/1993 | Lauffer et al. |
| 6,448,485 | B1 | 9/2002 | Barile |
| 6,716,139 | B1 | 4/2004 | Hosseinzadeh-Dolkhani et al. |
| 6,746,247 | B2 | 6/2004 | Barton |
| 7,825,319 | B2 | 11/2010 | Turner |
| 7,872,188 | B2 * | 1/2011 | Willis ...................... A61B 5/024 84/600 |
| 7,915,512 | B2 * | 3/2011 | Fratti ........................ G10H 1/40 84/612 |
| 8,101,843 | B2 | 1/2012 | Turner |
| 9,424,348 | B1 | 8/2016 | Riggs-Zeigen |
| 9,563,700 | B2 * | 2/2017 | Garmark ........... G06F 17/30743 |
| 2007/0074617 | A1 * | 4/2007 | Vergo ................. G06F 17/30743 84/612 |
| 2008/0097633 | A1 * | 4/2008 | Jochelson ............ G11B 27/105 700/94 |
| 2013/0228063 | A1 | 9/2013 | Turner |
| 2013/0228064 | A1 | 9/2013 | Turner |
| 2014/0334653 | A1 * | 11/2014 | Luna ....................... G05B 15/02 381/332 |
| 2015/0081066 | A1 * | 3/2015 | Yeh ...................... G06F 19/3406 700/94 |

FOREIGN PATENT DOCUMENTS

| JP | 2003-108154 A | 4/2003 |
| JP | 2004-113552 A | 4/2004 |

* cited by examiner

*Primary Examiner* — Hemant Patel
(74) *Attorney, Agent, or Firm* — Mintz, Levin, Cohn, Ferris, Glovsky and Popeo, P.C

(57) ABSTRACT

Using data generated by a sensor, a current value of a metric representative of a physiological state of a user of a digital content playback device can be determined. This metric can be compared to a set of predefined target ranges, and a tempo increase factor can be selected based on a range within the set of predefined target ranges to which the metric corresponds. The tempo increase factor can be applied to adjust a current playback tempo of music provided by the digital content playback device to the user. Methods, systems, articles of manufacture, and the like capable of implementing such features are described.

20 Claims, 3 Drawing Sheets

300

| SUB-ZONE | % OF MAX HEART RATE | TEMPO SCALING FACTOR |
|---|---|---|
| 1 | 50-55 | 1.01 |
| 2 | 55-60 | 1.03 |
| 3 | 60-65 | 1.05 |
| 4 | 65-70 | 1.08 |
| 5 | 70-75 | 1.11 |
| 6 | 75-80 | 1.13 |
| 7 | 80-85 | 1.14 |
| 8 | 85-90 | 1.13 |
| 9 | 90-95 | 1.08 |
| 10 | 95-100 | 1.01 |

| SUB-ZONE | % OF MAX HEART RATE | TEMPO SCALING FACTOR |
|---|---|---|
| 1 | 50-55 | 1.01 |
| 2 | 55-60 | 1.03 |
| 3 | 60-65 | 1.05 |
| 4 | 65-70 | 1.08 |
| 5 | 70-75 | 1.11 |
| 6 | 75-80 | 1.13 |
| 7 | 80-85 | 1.14 |
| 8 | 85-90 | 1.13 |
| 9 | 90-95 | 1.08 |
| 10 | 95-100 | 1.01 |

*FIG. 3*

PHYSIOLOGICAL STATE-DRIVEN PLAYBACK TEMPO MODIFICATION

CROSS-REFERENCE TO RELATED APPLICATION

The current application is related to application Ser. No. 14/273,495 filed May 8, 2014, the disclosure of which is incorporated herein by reference in its entirety.

TECHNICAL FIELD

The subject matter described herein relates to playback of audio media with one or more modifications that can be prompted by data provided by one or more sensors measuring or providing indications of a user's physiological state.

BACKGROUND

Music can be an important part of an exercise or other physical activity routine for many people. For example, runners, weight lifters, participants in aerobic exercises, users of cardiovascular exercise machines (e.g. stair steppers, stationary bicycles, elliptical motion machines, and the like), etc. frequently listen to music while participating in such activities. Music can help alleviate boredom, and a particularly motivational or inspirational song or group of songs can be helpful in maintaining focus and improving performance. However, while a user can assemble a group of songs (also referred to as a playlist or "mix") using one or more sources such as a personal music collection, an online music streaming service, or the like, such playlists generally lack the ability to react to the specifics of the physical activities that the user is performing at any given time.

SUMMARY

In one aspect, a method includes determining a current value of a metric representative of a physiological state of a user of a digital content playback device using data generated by a sensor and comparing the metric to a set of predefined target ranges. The method further includes selecting a tempo increase factor based on a range within the set of predefined target ranges to which the metric corresponds and applying the tempo increase factor to adjust a current playback tempo of music provided by the digital content playback device to the user.

In some variations one or more of the following features can optionally be included in any feasible combination. For example, the sensor can optionally include at least one of a position determination device, a motion determination device, and a physiological sensor. The method can optionally include comparing a rate of change of the metric to the set of predefined target ranges. The rate of change can optionally be calculated for data collected over a trailing period of time. The metric can optionally include a heart rate of the user.

The set of predefined target ranges can optionally be calculated based on fractions of a maximum heart rate of the user, which is determined by subtracting an age of the user from a set number. The set of predefined ranges can optionally include a first range between approximately 50% and 60% of the maximum heart rate, a second range between approximately 60% and 70% of the maximum heart rate, a third range between approximately 70% and 80% of the maximum heart rate, a fourth range between approximately 80% and 90% of the maximum heart rate, and a fifth range between approximately 90% and 100% of the maximum heart rate. Each range in the set of predefined ranges can optionally be further divided into two subzones corresponding to a 5% range of the maximum heart rate such that the set of predefined ranges includes 10 subzones between 50% and 100% of the maximum heart rate. The tempo increase factor can optionally be approximately 1.01 when the heart rate is within a first subzone comprising approximately 50% to 55% of the maximum heart rate, approximately 1.03 when the heart rate is within a second subzone comprising approximately 55% to 60% of the maximum heart rate, approximately 1.05 when the heart rate is within a third subzone comprising approximately 60% to 65% of the maximum heart rate, approximately 1.08 when the heart rate is within a fourth subzone comprising approximately 65% to 70% of the maximum heart rate, approximately 1.11 when the heart rate is within a fifth subzone comprising approximately 70% to 75% of the maximum heart rate, approximately 1.13 when the heart rate is within a sixth subzone comprising approximately 75% to 80% of the maximum heart rate, approximately 1.14 when the heart rate is within a seventh subzone comprising approximately 80% to 85% of the maximum heart rate, approximately 1.13 when the heart rate is within an eighth subzone comprising approximately 85% to 90% of the maximum heart rate, approximately 1.08 when the heart rate is within a ninth subzone comprising approximately 90% to 95% of the maximum heart rate, and approximately 1.01 when the heart rate is within a tenth subzone comprising approximately 95% to 100% of the maximum heart rate Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to music playback, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows a table showing example scaling factors consistent with an implementation of the current subject matter.

When practical, similar reference numbers denote similar structures, features, or elements.

DETAILED DESCRIPTION

Figure 1:
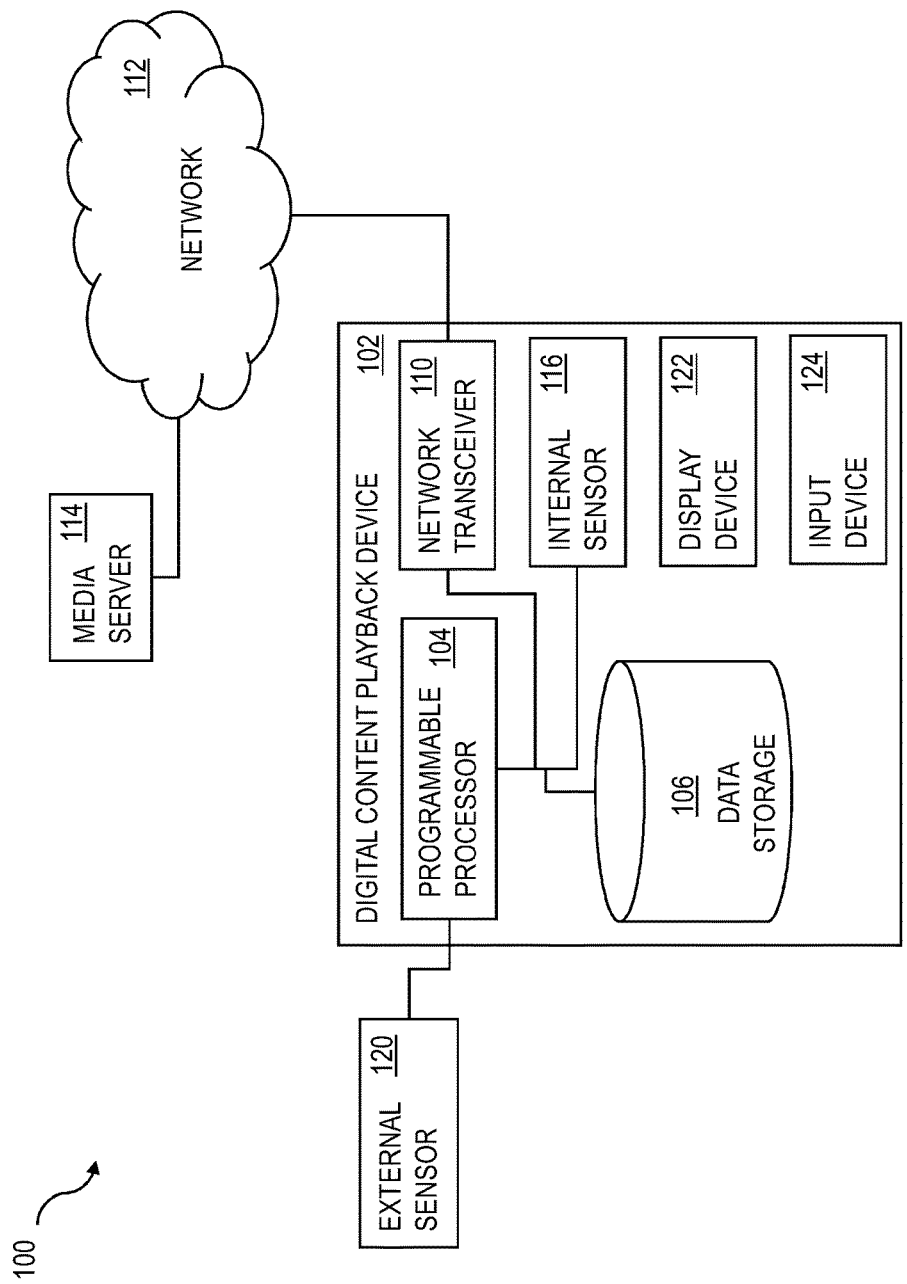
FIG. 1 shows a diagram illustrating aspects of a system showing features consistent with implementations of the current subject matter.

Beneficial effects can result from coordinating a tempo of music a user is listening to and one or more metrics of the user's physiological state, physical effort being expended (e.g. exertion), and general well-being. In some examples, the tempo of music that a user listens to can provide encouragement or other assistance in matching a desired pace, or in keeping the user's heart rate and/or other metrics of physiological state within a target range.

Consistent with implementations of the current subject matter, a tempo of a currently playing audio content item can be dynamically changed in response to changes in one or more metrics that are representative of a physiological state of a user of a digital content playback device. In some examples, the metric representative of the user's physiological state can be a heart rate. Other metrics are also within the scope of the current subject matter. For example, blood pressure, metabolic rate, respiration rate, perspiration rate, or other more other metrics can also or alternatively be used as representative of physiological state. The change in tempo can include increasing or decreasing a beats per minute (BPM) or other tempo metric within a currently playing audio content item (e.g. by "speeding it up" or "slowing it down") or by transitioning to a different song or track (e.g. a different audio content item) with a different tempo, etc. The change can optionally be gradual such that the tempo is not changed suddenly or too frequently. The change in tempo can be accomplished consistent with the approach discussed below.

Use of portable devices for playback of digital audio content has become increasingly common. In addition to dedicated devices, such as for example early generation versions of the iPod™ available from Apple Computer, Inc., cellular phones, smart phones, tablet computing devices, and the like are almost ubiquitous. Such devices, which are referred to herein as digital content playback devices, are generally capable of playing digital audio content that is stored on a data storage device (such as for example flash memory, a magnetic hard drive, optical media, etc.), which can optionally be internal to the digital content playback device. In addition, many currently available digital content playback devices of this type are also capable of streaming music over a network connection from a server computer. Such a network connection can optionally include one or more of the Internet, a wide area wireless network (e.g. a cellular service network), a local area wireless network (e.g. a WiFi connection based on one or more 802.11 protocols), or other radio or optical communication links (e.g. Bluetooth, infrared, etc.). For the purposes of this disclosure, the term audio content item refers generally to a music file, other digital audio content or the like that a digital content playback device processes to produce audible playback of the included content to a user of the digital content playback device.

FIG. 1 shows a diagram 100 illustrating features that can be present in a system or systems capable of providing one or more features consistent with implementations of the current subject matter. A digital content playback device 102 can include at least one programmable processor 104 and can also include or be locally connected to a data storage device 106 (e.g. a hard drive, a flash memory or memory card, a solid-state drive, an optical drive, or the like) that stores one or more digital media files that can be replayed to produce audible music via one or more sound producing devices (e.g. headphones, one or more speakers, etc.). The digital content playback device 102 can optionally include a network transceiver 110 via which the digital content playback device 102 can communicate over a network 112 with a media server 114. The network 112 can include any of the options discussed above or their functional equivalents in any feasible combination, and the network transceiver 110 can include one or more of a WiFi transceiver, a cellular transceiver, a bluetooth transceiver, or the like for sending and receiving data in communication with the media server 114 over the network 112.

The media server 112 can be implemented on one or more programmable machines that include one or more processors. In some examples, the media server 112 can include a "cloud" based music service. In other examples, the media server 112 can include a networked machine situated within a smaller-scale network, such as for example a home or commercial network. Consistent with other implementations of the current subject matter, audio content played by the digital content playback device 102 can be stored locally at the digital content playback device 102, for example in the data storage device 106 or other storage or memory internal to or associated with the digital content playback device 102. For example, a digital content playback device 102 having a hard drive, flash storage, random access memory, read-only memory, SD card, or the like that locally stores audio content can use that locally stored audio content for playback consistent with one or more of the approaches discussed herein.

The digital content playback device 102 can optionally include one or more internal sensors 116 that provide input data to the programmable processor 104. In some implementations of the current subject matter, the programmable processor 104 can alternatively or additionally receive input data from one or more external sensors 120. The internal sensor(s) 116 and/or external sensor(s) 120 can include position and/or motion determination devices as well as one or more physiological sensors. Examples of position and/or motion determination devices include global positioning system (GPS) transceivers, accelerometers (e.g. a device that measures movement and gravity, as well as an angle of orientation), gyroscopes, compasses, etc. Physiological sensors refer to sensors for providing data relating to a user's physiological state, such as for example heart-rate monitoring devices, blood pressure monitoring devices, metabolic rate monitoring devices (e.g. a device for estimating, determining, measuring, etc. a metabolic rate or other factors relating to a rate at which a user's body uses energy from one or more food sources or other body stores such as fat), electrocardiogram (ECG) sensors, respiration rate sensors, lung volume sensors, skin temperature sensors, skin conductance response (SCR) sensors (e.g. for measuring data that can be used for estimating perspiration rates), blood oxygen saturation ($SpO_2$) sensors, or the like.

The internal sensors 116 can communicate with the programmable processor 104 over an internal communication bus of the digital content playback device 102 or via any feasible connections. External sensors 120 can communicate with the programmable processor 104 over a communication path than can include a Bluetooth connection, an infrared connection, an RFID connection, some other kind of wireless communication link, a wired connection, or the like. The term "sensors" is used throughout the reminder of this disclosure to refer interchangeably to internal sensors 116 and external sensors 120 unless a contrary usage is explicitly indicated.

The programmable processor 104 can execute an audio content modification module or program (referred to herein as a decision making module or DMM), which can optionally be an "app," a web application (e.g. application software that runs in a web browser or is created in a browser-supported programming language, such as one or more of JavaScript, HTML, CSS, etc., and that relies on a common web browser to render the application), a native application (e.g. an application program that has been developed for use on a particular platform or device), or the like. The digital content playback device 102 can also include a display device (e.g. a screen) for displaying information to the user and one or more input devices (e.g. a touch screen, a stylus, one or more buttons or keys, a touch or mechanical keyboard, etc.) for receiving input from the user.

Sensor data generated by the sensors (e.g. one or more internal sensors 116 and/or external sensors 120) ("sensor data") can be stored in the data storage device 106 and thereby retained on the digital content playback device 102 for later analysis. Optionally, the sensor data can alternatively or additionally be transmitted to a networked storage (not shown in FIG. 1). In some examples, data transmitted to a networked storage is anonymized or alternatively stored in a secure manner to maintain privacy of the user. The stored sensor data can be stored at a storage or analysis interval that is useful for making determinations of actions to be taken in response to a physical or physiological state of the user, a level of activity of the user, etc. For example, a sensor data storage interval can optionally be one second, 5 seconds, 10 seconds, etc. When the sensor data are generated at a finer time interval than the storage or analysis interval, the data can be aggregated, for example by averaging over the longer storage or analysis interval, etc.

Periodically, the generated sensor data can be analyzed to estimate a current level of physical performance or other physiological metric of the user and to determine if some change in the supplied audio content is indicated. Co-pending and co-owned patent application Ser. No. 14/273, 495 (incorporated herein by reference) describes approaches to altering audio content playback tempo in response to (among other factors) a measured user pace. Implementations of the current subject matter can optionally include such features in addition to modifications of playback tempo based on physiological state measurements as discussed herein. While not an exhaustive list, examples of actions that can be taken to cause a change in the supplied audio content can include changing a tempo (e.g. a number of beats per minute or BPM) of musical audio content being played back to the user, and optionally one or more of inserting a motivational additional audio track that overlays the currently supplied audio content item (e.g. a "voice-over" reading an inspirational or motivational statement, quotation, or the like), skipping to a higher or lower intensity part of a song or a group of songs or within a continuous "mix" of songs, etc. A higher or lower intensity song or other audio content item can include a higher or lower beats per minute, or alternatively can meet other criteria or classifying features relating to higher or lower intensity, more or less motivational, etc. Such criteria can be pre-defined (e.g. stored in a library or other database based on settings defined globally) for individual audio content items or groups of audio content items. Alternatively or in addition, criteria can be defined or modified for content items or groups of content items based on user input, which can be received via a user interface on the digital content playback device 102, via a web interface (e.g. using a browser on another device, such as a computer a tablet, etc. or on the digital content playback device 102 itself), or by any other approach.

Figure 2:
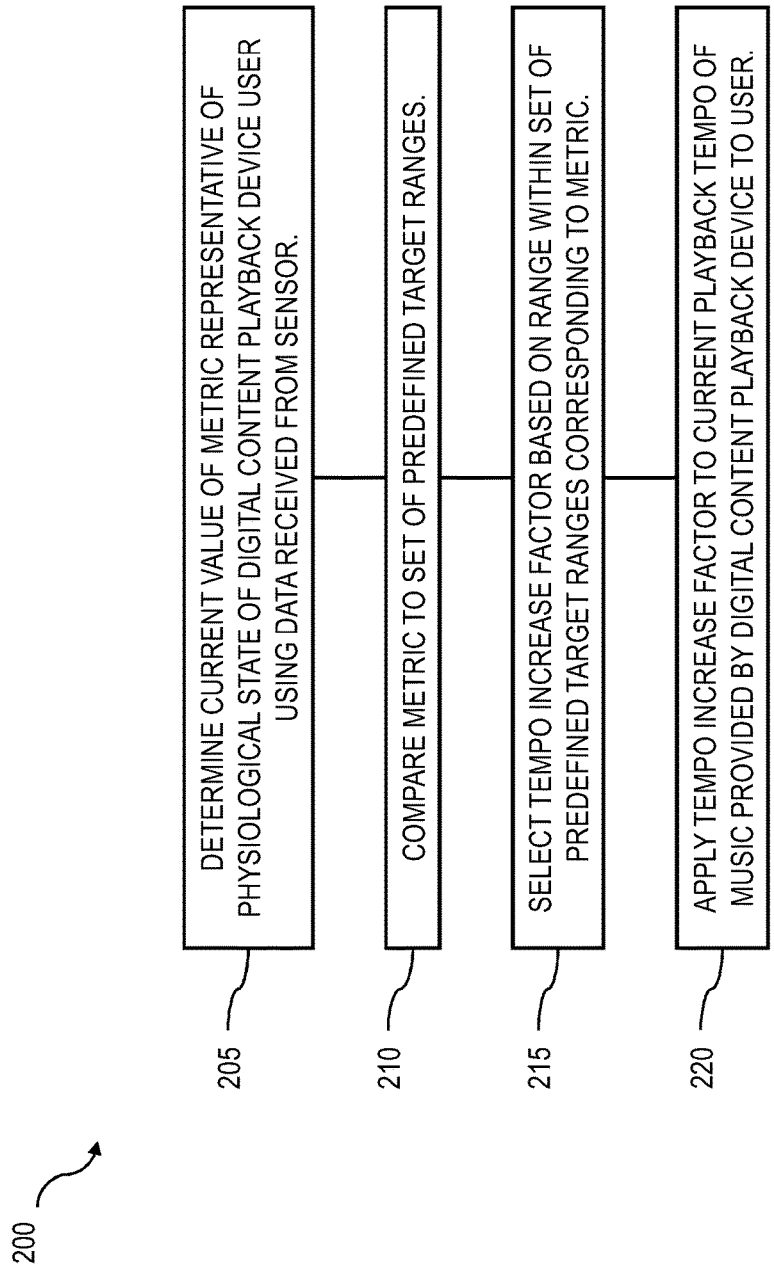
FIG. 2 shows a process flow diagram illustrating aspects of a method having one or more features consistent with implementations of the current subject matter.

FIG. 2 shows a process flow chart 200 illustrating features of a method consistent with an implementation of the current subject matter. One or more of these features can be included in other implementations. At 205, processing hardware determines a current value of a metric representative of a physiological state of a user of a digital content playback device 102 using data generated by a sensor (e.g. one or more internal and/or external sensors 116, 120). The processing hardware compares the metric and optionally a rate of change of the metric to a set of predefined target ranges at 210, and at 215 selects a tempo increase factor based on a range within the set of predefined target ranges corresponding to the metric. At 220 the processing hardware applies the tempo increase factor to adjust a current playback tempo of music provided by the digital content playback device 102 to the user. The method can also include receiving the data from the sensor at a sampling rate, which can in some examples be approximately every half-second, approximately every second, approximately every two seconds, approximately every five seconds, or the like.

An approach consistent with implementations of the current subject matter can be better understood by description of an example in which the metric representative of the user's physiological state is a heart rate, and the sensor includes a heart rate sensor that measures or estimates the user's heart rate. In such an example, the current value of the metric is a most recent heart rate value as provided by the sensor and the rate of change can be based on heart rate data collected over some trailing amount of time, such as for example the past second, 10 seconds, etc.

For heart rate data, the set of predefined target ranges can be based on a standard heart rate zone chart. A user's heart rate zones can be calculated, for example based on the user's maximum heart rate (which can be determined by subtracting the user's age from a set number, such as for example 220). Five heart rate zones are generally defined based on fractions of the maximum heart rate. These heart rate zones can include 50% to 60% of the maximum heart rate defining a first zone, 60% to 70% of the maximum heart rate defining a second zone, 70% to 80% of the maximum heart rate defining a third zone, 80% to 90% of the maximum heart rate defining a fourth zone, and 90% to 100% of the maximum heart rate defining a fifth zone. In some examples, the first zone can correspond to a warm-up phase or other light exercise while the second zone corresponds to a relatively slow running pace or the like, the third zone corresponds to an aerobic exercise zone, the fourth zone corresponds to an anaerobic exercise zone, and the fifth zone corresponds to a maximum VO2 (oxygen exchange volume) exercise zone.

Other divisions of a user's heart rate into a set of zones are also within the scope of the current subject matter, as are other labels or designations for the zones. Within these zones, further divisions can be included. For example, each of the heart rate zones can be divided into a low and a high sub-zone such that in one example the target ranges include a total of 10 heart rate subzones, each corresponding to a 5% range of the maximum heart rate between 50% and 100%. FIG. 3 shows a table 300 listing these subzones. The set of target ranges can be defined using other criteria. For example, each range does not need to have a same range as all of the other ranges.

In general, the set of target ranges can include increases in music tempo consistent with encouraging the user to maintain a level of exertion consistent with keeping the user's physiological state within a preferred range. Using heart rate data as the metric, the music played from the user's digital content playback device 102 can advantageously be approximately unchanged (or only slightly increased) while the user is in a first heart rate range. As the user continues exercising and his or her heart rate increases, the tempo increase factor can increase slightly under automatic control based on the measured heart rate. Within a certain physiological state range, a maximum tempo increase can be applied. For physiological states indicative of greater stress above this maximum tempo increase range, the tempo increase factor can be reduced to discourage the user from achieving a potentially dangerous physiological state.

For the heart rate example illustrated in FIG. 3, the maximum tempo increase factor occurs when the heart rate is detected to be subzone 7 (80-95% of maximum heart rate), which is on the low end of heart rate zone 4 as defined above. A similar but slightly lower tempo increase occurs for subzone 8, but then in subzones 9 and 10 (which correspond to 90-95% and 95-100% of maximum heart rate, respectively), the tempo increase factor is reduced because exercising to a near-maximum heart rate exertion level for an extended period of time can be dangerous.

Implementations of the current subject matter can also include further features. For example, again referring to the heart rate example for illustrative purposes, the processing hardware can perform a check to determine if the measured heart rate is fluctuating around a subzone (e.g. moving back and forth between two ranges of the set of predefined ranges). If so, the processing hardware can keep the tempo increase factor steady at the value corresponding to the metric range for the lower exertion physiological state. For example, if a user's heart rate is fluctuating between subzones 4 and 5 shown in FIG. 3, the tempo increase factor can be maintained at 1.08 (corresponding to subzone 4). A threshold amount of time (e.g. 5 seconds or some other amount) can be defined as the criterion for fluctuation. If the measured metric makes more than one round trips between neighboring ranges of the set of predefined ranges within the threshold amount of time, this can be labeled as fluctuating and the tempo increase factor can be maintained at the value for the lower range.

In other examples, the current subject matter can also detect when the user is "cooling down" other otherwise seeking to attain a less strenuous physiological state. This detection can include the processing hardware determining that a drop in physiological state by more than a threshold amount within some threshold period of time corresponds to a the user cooling off. For example, if the user's heart rate drops by 5 beats per minute in a 5 second time frame without an increase of 3 beats per minute in those 5 seconds, the user is determined to be "cooling down" and the processing hardware can cause a more rapid decrease in the tempo increase factor than would ordinarily occur from moving from one range to a next lower range in the set of predefined ranges.

In some implementations of the current subject matter applicable to a user who is exercising by running (or performing some other rhythmic exercise such as using a stair climbing machine, treadmill, elliptical, etc.), when the music tempo is initially lower than the user's step cadence (e.g. number of steps per minute) but would cross over to become faster than a current step cadence as a result of applying a tempo increase factor based on heart rate or some other metric of physiological state, the tempo can be capped at the step cadence. This approach can be beneficial in not disrupting a user's sense of rhythm. In cases where the music tempo "crosses over" from below the step cadence to above, the user may experience a feeling of discomfort or unease. Such an approach can be implemented by comparing a current step cadence of the user to a target music tempo that will be reached by applying a selected tempo increase factor and constraining the selected tempo increase factor to limit the target music tempo to be less than or equal to the step cadence.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   determining, using data generated by a sensor, a current value of a metric representative of a physiological state of a user of a digital content playback device, wherein the metric comprises a heart rate of the user;
   comparing the metric to a set of predefined target ranges;
   comparing a rate of change of the metric to the set of predefined target ranges;
   selecting a tempo increase factor based on the rate of change and based on a range within the set of predefined target ranges to which the current value of the metric corresponds; and
   applying the tempo increase factor to adjust a current playback tempo of music provided by the digital content playback device to the user.

2. A computer-implemented method as in claim 1, wherein the sensor comprises at least one of a position determination device, a motion determination device, and a physiological sensor.

3. A computer-implemented method as in claim 1, further comprising:
   measuring the metric over a period of timer;
   determining whether the metric moves back and forth between two ranges of the set of predefined target ranges; and
   selecting the tempo increase factor corresponding to one range of the two ranges associated with a lower exertion physiological state.

4. A computer-implemented method as in claim 3, wherein the rate of change is calculated for data collected over a trailing period of time.

5. A computer-implemented method as in claim 1, further comprising:
   detecting that the rate of change of the metric has decreased by an amount that satisfies a threshold, wherein the selecting further comprises selecting, in response to the detecting, the tempo increase factor, the tempo increase factor corresponding to a range within the set of predefined target ranges lower than the range to which the current value of the metric corresponds.

6. A computer-implemented method as in claim 5, wherein the set of predefined target ranges are calculated based on fractions of a maximum heart rate of the user, which is determined by subtracting an age of the user from a set number.

7. A computer-implemented method as in claim 6, wherein the set of predefined ranges comprise a first range between approximately 50% and 60% of the maximum heart rate, a second range between approximately 60% and 70% of the maximum heart rate, a third range between approximately 70% and 80% of the maximum heart rate, a fourth range between approximately 80% and 90% of the maximum heart rate, and a fifth range between approximately 90% and 100% of the maximum heart rate.

8. A computer-implemented method as in claim 7, wherein each range in the set of predefined ranges is further divided into two subzones corresponding to a 5% range of the maximum heart rate such that the set of predefined ranges includes 10 subzones between 50% and 100% of the maximum heart rate.

9. A computer-implemented method as in claim 8, wherein the tempo increase factor is approximately 1.01 when the heart rate is within a first subzone comprising approximately 50% to 55% of the maximum heart rate, approximately 1.03 when the heart rate is within a second subzone comprising approximately 55% to 60% of the maximum heart rate, approximately 1.05 when the heart rate is within a third subzone comprising approximately 60% to 65% of the maximum heart rate, approximately 1.08 when the heart rate is within a fourth subzone comprising approximately 65% to 70% of the maximum heart rate, approximately 1.11 when the heart rate is within a fifth subzone comprising approximately 70% to 75% of the maximum heart rate, approximately 1.13 when the heart rate is within a sixth subzone comprising approximately 75% to 80% of the maximum heart rate, approximately 1.14 when the heart rate is within a seventh subzone comprising approximately 80% to 85% of the maximum heart rate, approximately 1.13 when the heart rate is within a eighth subzone comprising approximately 85% to 90% of the maximum heart rate, approximately 1.08 when the heart rate is within a ninth subzone comprising approximately 90% to 95% of the maximum heart rate, and approximately 1.01 when the heart rate is within a tenth subzone comprising approximately 95% to 100% of the maximum heart rate.

10. A computer-implemented method as in claim 1, further comprising:
   comparing a current step cadence of the user to a target music tempo that will be reached by applying the selected tempo increase factor to adjust the current playback tempo of music provided by the digital content playback device to the user; and
   constraining the selected tempo increase factor to limit the target music tempo to less than or equal to the step cadence.

11. A computer program product comprising a non-transitory machine-readable medium storing instructions that, when executed by at least one programmable processor, cause the at least one programmable processor to perform operations comprising:
   determining, using data generated by a sensor, a current value of a metric representative of a physiological state of a user of a digital content playback device, wherein the metric comprises a heart rate of the user;
   comparing the metric to a set of predefined target ranges;
   comparing a rate of change of the metric to the set of predefined target ranges;
   selecting a tempo increase factor based on the rate of change and based on a range within the set of predefined target ranges to which the current value of the metric corresponds; and
   applying the tempo increase factor to adjust a current playback tempo of music provided by the digital content playback device to the user.

12. A computer program product as in claim 11, wherein the sensor comprises at least one of a position determination device, a motion determination device, and a physiological sensor.

13. A computer program product as in claim 11, wherein the operations further comprise:
   measuring the metric over a period of timer;
   determining whether the metric moves back and forth between two ranges of the set of predefined target ranges; and
   selecting the tempo increase factor corresponding to one range of the two ranges associated with a lower exertion physiological state.

14. A computer program product as in claim 11, wherein the operations further comprise:
   detecting that the rate of change of the metric has decreased by an amount that satisfies a threshold, wherein the selecting further comprises selecting, in response to the detecting, the tempo increase factor corresponding to a range within the set of predefined target ranges lower than the range to which the current value of the metric corresponds.

15. A computer program product as in claim 14, wherein the set of predefined target ranges are calculated based on fractions of a maximum heart rate of the user, which is determined by subtracting an age of the user from a set number.

16. A computer program product as in claim 15, wherein the tempo increase factor is approximately 1.01 when the heart rate is within a first subzone comprising approximately 50% to 55% of the maximum heart rate, approximately 1.03 when the heart rate is within a second subzone comprising approximately 55% to 60% of the maximum heart rate, approximately 1.05 when the heart rate is within a third subzone comprising approximately 60% to 65% of the maximum heart rate, approximately 1.08 when the heart rate is within a fourth subzone comprising approximately 65% to 70% of the maximum heart rate, approximately 1.11 when the heart rate is within a fifth subzone comprising approximately 70% to 75% of the maximum heart rate, approximately 1.13 when the heart rate is within a sixth subzone comprising approximately 75% to 80% of the maximum heart rate, approximately 1.14 when the heart rate is within a seventh subzone comprising approximately 80% to 85% of the maximum heart rate, approximately 1.13 when the heart rate is within a eighth subzone comprising approximately 85% to 90% of the maximum heart rate, approximately 1.08 when the heart rate is within a ninth subzone comprising approximately 90% to 95% of the maximum heart rate, and approximately 1.01 when the heart rate is within a tenth subzone comprising approximately 95% to 100% of the maximum heart rate.

17. A computer program product as in claim 11, wherein the operations further comprise:
   comparing a current step cadence of the user to a target music tempo that will be reached by applying the selected tempo increase factor to adjust the current playback tempo of music provided by the digital content playback device to the user; and
   constraining the selected tempo increase factor to limit the target music tempo to less than or equal to the step cadence.

18. A digital content playback device comprising:
   at least one programmable processor; and
   a machine-readable medium storing instructions that, when executed by the at least one programmable processor, cause the at least one programmable processor to perform operations comprising:
   determining, using data generated by a sensor, a current value of a metric representative of a physiological state of a user of the digital content playback device, the metric comprising a heart rate of the user;
   comparing the metric and a rate of change of the metric to a set of predefined target ranges;
   selecting a tempo increase factor based on a range within the set of predefined target ranges to which the current value of the metric and the rate of change of the metric correspond; and
   applying the tempo increase factor to adjust a current playback tempo of music provided by the digital content playback device to the user.

19. A digital content playback device as in claim 18, further comprising the sensor, the sensor comprising a heart rate monitor.

20. A digital content playback device as in claim 18, wherein the operations further comprise:
   comparing a current step cadence of the user to a target music tempo that will be reached by applying the selected tempo increase factor to adjust the current playback tempo of music provided by the digital content playback device to the user; and constraining the selected tempo increase factor to limit the target music tempo to less than or equal to the step cadence.

* * * * *